(12) United States Patent
Sadakuni

(10) Patent No.: US 6,594,649 B2
(45) Date of Patent: *Jul. 15, 2003

(54) INTERACTIVE ARTIFICIAL INTELLIGENCE

(75) Inventor: Naoki Sadakuni, Iwata (JP)

(73) Assignee: Yamaha Hatsudoki Kabushiki Kaisha, Shizuoka-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,247

(22) Filed: Sep. 10, 1999

(65) Prior Publication Data

US 2003/0074337 A1 Apr. 17, 2003

(51) Int. Cl.⁷ .............................................. G06F 75/18
(52) U.S. Cl. ....................................................... 706/14
(58) Field of Search ........................... 706/14, 902, 903

(56) References Cited

U.S. PATENT DOCUMENTS

| | | | |
|---|---|---|---|
| 5,682,469 A | 10/1997 | Linnett et al. | 345/473 |
| 5,852,819 A | 12/1998 | Beller | 707/1 |
| 5,870,730 A * | 2/1999 | Furuya et al. | 706/47 |
| 5,999,895 A | 12/1999 | Forest | 704/1 |
| 5,999,908 A | 12/1999 | Abelow | 705/1 |
| 6,005,549 A | 12/1999 | Forest | 345/157 |
| 6,034,652 A | 3/2000 | Frellberger et al. | 345/730 |
| 6,085,183 A * | 7/2000 | Horn et al. | 706/45 |
| 6,195,651 B1 | 2/2001 | Handel et al. | 707/2 |
| 6,219,657 B1 * | 4/2001 | Hatayama | 706/14 |

FOREIGN PATENT DOCUMENTS

| | | |
|---|---|---|
| JP | 10-328422 | 12/1998 |
| JP | 11-126017 | 5/1999 |

OTHER PUBLICATIONS

Takanori Shibata et al.; Artificial Emotional Creature for Human–Machine Interaction; Jan. 1997; IEEE; 0–7803–4053; 2269–2274.*

Hiroshi Kobayashi et al; Facial interaction between Animated 3D Face Robot and Human Beings; Jan. 1997; IEEE; 0–7803–4053; 3732–3737.*

* cited by examiner

Primary Examiner—John Follansbee
Assistant Examiner—Joseph P. Hirl
(74) Attorney, Agent, or Firm—Knobbe, Martens, Olsen & Bear LLP

(57) ABSTRACT

Behavior of a device is modified based on the device's experience. The device includes: (i) a sensing unit for sensing signals; (ii) a concern-generating unit programmed to generate concern-parameters; (iii) an emotion-generating unit programmed to generate emotion-parameters; and (iv) an actuating unit for actuating the device. When the device is in a situation, the device extracts memory relevant to the situation to obtain concern-parameters previously generated in the situation. The behavior of the device is regulated by concern-parameters in the memory and emotion-parameters generated based on the concern-parameters, and accordingly, the device can modify or improve its behavior.

5 Claims, 9 Drawing Sheets

INTERACTIVE ARTIFICIAL INTELLIGENCE

BACKGROUND OF THE INVENTION

1. Field of the Invention

The present invention relates to a method for adjusting behavior of a device, and particularly to a method for adjusting the behavior based on the device's experience.

2. Description of the Related Art

Conventionally, various controlling methods have been available for controlling a device in accordance with a user's demand.

In such controlling methods, normally, the user sets a target value at output which the user wants, and the device is controlled in such a way that the output matches the target value, while feeding the output back to a control system which compares the feedback and the target value to adjust the output. In the above, by feeding the output back to the system to adjust the output, the output of the device to be controlled can approach the target value, thereby achieving control satisfying the user's preference.

However, the above control system may not be appropriate in an area where the user can develop emotions such as companionship toward a device. Such a device includes toys, games, communication tools, search tools, and other tools and devices subjected to personal use. Further, if a target value is not determinable due to the system's complexity or lack of information, the conventional control system does not work.

Furthermore, if a device senses numerous pieces of information, it is difficult to sort them out and use them as useful information to act thereon. If the device is operated solely in accordance with the user's command, the above may not be a problem. However, for an autonomic device which acts without the user's command, it is important to obtain meaningful information.

SUMMARY OF THE INVENTION

A general objective of the present invention is to provide a control system which enables a device to autonomously modify its behavior or performance through interaction with its external environment, i.e., based on its experience. That is a self-development system. The control system can generate pseudo-emotions which are used as a parameter for controlling behavior. The control system can collect information on an object of its own concern, and can store the information and update it by itself. This autonomous behavior system is advantageous, especially when applied to robots, toys, or games. The present invention has exploited a real-time basis behavior-adjusting system.

An embodiment of the present invention is a method for adjusting behavior of a device based on the device's experience. The device comprises: (i) a sensing unit for sensing signals; (ii) a concern-generating unit programmed to generate concern-parameters; (iii) an emotion-generating unit programmed to generate emotion-parameters; and (iv) an actuating unit for actuating the device. The method comprises the steps of: (a) recognizing an object based on signals receivable by the device, said device having initial concern parameters; (b) extracting information, if any, on concern-parameters from a memory under at least the index of the object, said memory storing under the index of the object, information on concern-parameters previously generated by the device through past interaction with the object; (c) modifying the initial concern-parameters by the extracted information on concern-parameters; (d) actuating the device based on the modified concern-parameters and emotion-parameters generated by the device based at least on the modified concern-parameters; and (e) inputting in the memory, under the index of the object, concern-parameters generated by the device upon interaction with the object, thereby updating the memory. Accordingly, when the device is in a situation, the device recalls (extracts) memory relevant to the situation to obtain concern-parameters previously generated in the situation. The behavior of the device is regulated by concern-parameters in the memory and emotion-parameters generated based on the concern-parameters, and accordingly, the device can modify or improve its behavior.

In the above, in an embodiment, the emotion-parameters are generated based on a discrepancy between the current concern-parameters and the modified concern-parameters under predetermined rules. By using a hierarchical structure composed of a concern layer and a emotion layer, wherein the former is higher than the latter, the device can behave autonomously. Further, in an embodiment, the behavior is selected based on the modified concern-parameters, and is then modified based on the emotion-parameters under predetermined rules.

In the above, in an embodiment, the device further comprises a working memory which temporarily pools and stores information from the sensing unit, the concern-generating unit, and the first-mentioned memory until the device completes its action, and which outputs information to the concern-generating unit, the emotion-generating unit, the actuating unit, and the first-mentioned memory. Accordingly, processing becomes efficient.

The concern-parameters and the emotion-parameters can have any labels and definitions. For example, the concern-parameters can represent "safety", "affection", "hunger", and "play", respectively, and the emotion-parameters can represent "happy", "angry", "surprised", "sad", "fearful", and "disgust", respectively. The term "needs" can be a synonym for the concerns. The definition of each label can be predetermined. The number of concern-parameters and the number of emotion-parameters are not limited. The larger the number of parameters, the more complex the behavior becomes. If an object-oriented language program, such as JAVA and C++, is used for parameter control, new labels can be automatically created, so that new behavior can be generated accordingly.

A device controlled by the above control system can behave autonomously and improve behavior based on its experience.

The present invention can be applied to a method as well as an apparatus. Further, the system need not be an integrated system, but can be composed of plural separate units. That is, by networking plural devices or by using a separable medium (CD or IC card), an individual device can be downsized without losing memory and programming capacities.

DETAILED DESCRIPTION OF THE PREFERRED EMBODIMENT

The control system for controlling a device using emotion-parameters of the present invention (referred to as "control system") will be explained with reference to embodiments indicated in the figures.

Basic Control System

In an embodiment of the present invention, an agent or device comprises: (i) an external/internal condition recognition unit, (ii) a concern-generating unit, (iii) an emotion-generating unit, (iv) a long-term memory, (v) a working memory, (vi) a behavior planning unit, and (vii) an actuating unit. The above is a conceptual or functional structure, and need not be a physical structure; that is, these units need not be separately provided, but can be integrated. Further, each unit can be disposed in a device, but can also be disposed separately from the device.

Figure 1:
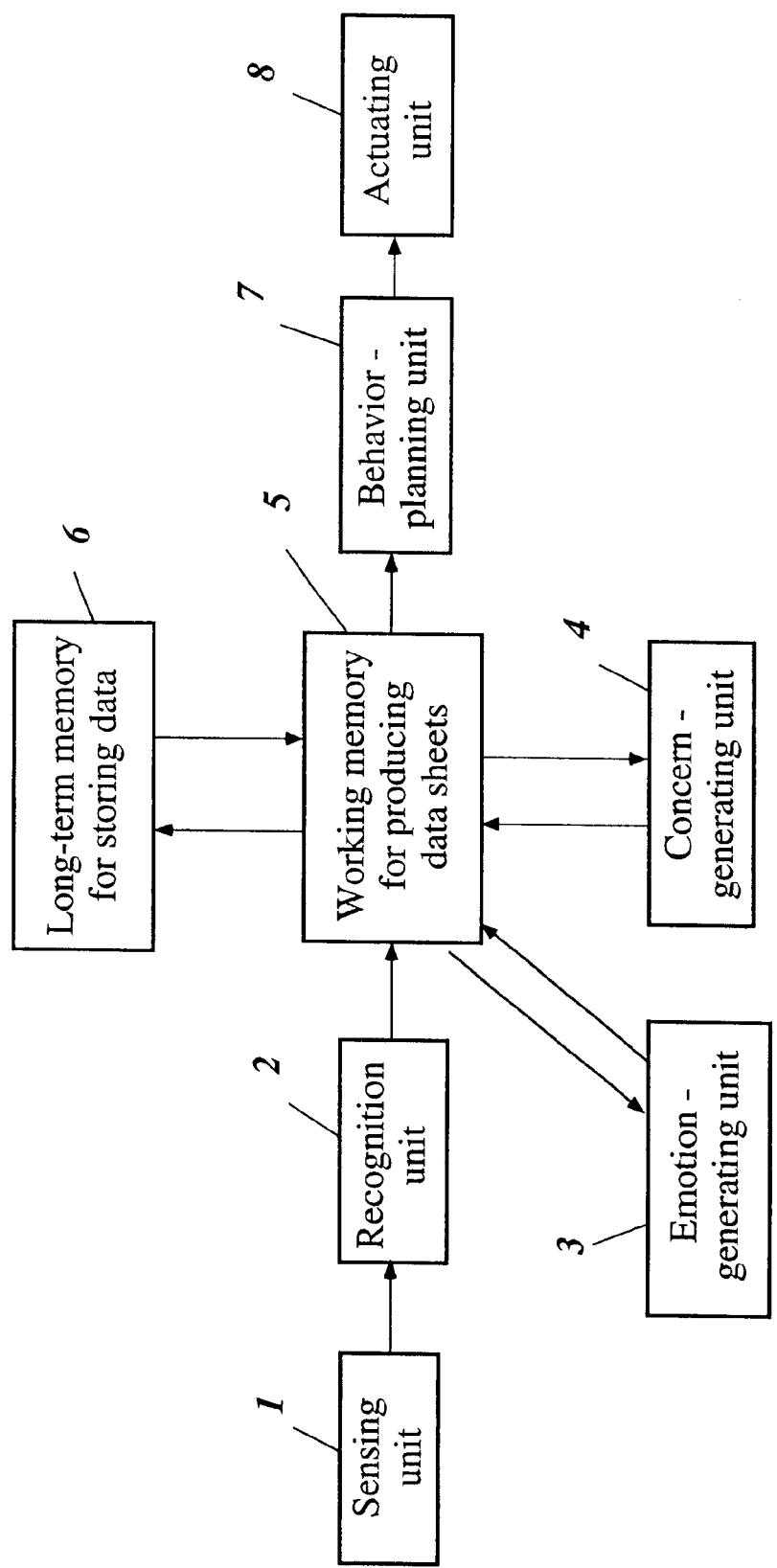
FIG. 1 is a diagram showing an embodiment of the entire control system according to the present invention.

FIG. 1 is a diagram showing an embodiment of the entire control system according to the present invention. As described above, this is a conceptual or functional structure, but not a physical structure.

In the embodiment of FIG. 1, an autonomic device comprises a sensing unit 1, a recognition unit 2, an emotion-generating unit 3, a concern-generating unit 4, a working memory 5 for producing data sheets, a long-term memory 6 for storing data, a behavior planning unit 7, and an actuating unit 8. The sensing unit 1 senses various signals including external and internal information. External information includes visual, tactile, auditory information, and electrically transmitted signals, and internal information includes battery level and malfunction signals. The sensed signals are inputted into the recognition unit 2 which analyzes the signals to generate meaningful information which includes characterization and identification of an event. This recognized information is inputted into the working memory 5 for producing data sheets. The concern-generating unit 4 is programmed to generate concern-parameters in response to the recognized information. The concern-parameters are not limited and may include "safety", "affection", "hunger", "study", and "play". The recognized information need not be all information but at least a piece of information (pre-selected) recognized at the recognition unit 2. Each concern-parameter is regulated independently of or harmoniously with each other. Each concern-parameter may include a time factor; that is, the value of each concern-parameter changes with time (some of them fade with time while others increase with time). Further, each concern-parameter may have its own predetermined function and fluctuate accordingly. The concern-generating unit 4 receives a signal from the working memory 5, and outputs a signal of concern to the working memory 5 which exchanges data with the long-term memory 6. The emotion-generating unit 3 is programmed to generate emotion-parameters in response to the concern-parameters retrieved from the long-term memory 6 via the working memory 5. This recognized information need not be all but part of the information (pre-selected) recognized at the recognition unit 2, and may be different from that used at the concern-generating unit 4. The emotion-parameters are not limited but may include "happy", "angry", "surprised", "sad", "fearful", and "disgust". Each emotion-parameter is regulated independently of or harmoniously with each other. Each emotion-parameter may include a time factor; that is, the value of each emotion-parameter changes with time (some of them fade with time while others increase with time). Further, the emotion-parameters are generated when receiving information from the working memory 5. The emotion-generating unit 3 outputs signals of emotions to the working memory 5 for producing data sheets. The long-term memory 6 is for storing data when the working memory 5 produces a final data sheet and inputs it to the long-term memory 6. The final data sheets are pooled and rearranged under the index of the object in the long-term memory 6 so that data can be retrieved as necessary. The data from the working memory 5 updates the long-term memory 6. In an embodiment, the working memory 5 can be omitted, and the long-term memory 6 can also function as the working memory 5, or vise versa. In another embodiment, the working memory 5 can be omitted, and the long-term memory 6 can also function as the working memory 5, or vise versa. In another embodiment, the working memory 5 can be omitted, and each of the emotion-generating unit 3 and the concern-generating unit 4 can include a memory and can be connected to each other and to the other units.

As described above, the working memory 5 receives signals from the recognition unit 2, the emotion-generating unit 3, the concern-generating unit 4, and the long-term memory 6 to produce data sheets (algorithms will be explained later). In the working memory 5, a data sheet may indicate an event, which includes an object and current situation surrounding the device recognized by the recognition unit 2, current concerns, which are generated by the concern-generating unit 4, and current emotions, which are generated by the emotion-generating unit 3. Variations in the concern-parameters when previously encountering the event, which are extracted from the long-term memory 6, can be but need not be indicated in the data sheet in the working memory 5. Variations in the concern-parameters stored in the long-term memory 6 are effectively used for finding an event to best compensate for the current variations in the concern-parameters, so that the device can select an action which may be most appropriate in the situation to modify the concern-parameters. Based on these data, the behavior-planning unit 7 decides on a pattern of behavior and outputs a signal to the actuating unit 8. At the behavior planning unit 7, a behavior pattern may be modified based on current emotions which are obtained by the emotion-generating unit 3; that is, behavior is selected based on the data on the event extracted from the long-term memory 6, and is modified based on the current emotions. Patterns of behavior are not limited but may include "approach", "attack", "avoid", "explore", and "random". If the device has various movable parts such as a tail, ears, hands, and eyebrows, various patterns of behavior can be formed. In the above, for a simple device, behavior can be selected without referring to the current emotions, and the emotion-generating unit 3 can be omitted.

Upon action by the actuating unit 8, the result is sensed by the sensing unit 1; that is, the result is fed back to the device.

For example, as a result of approaching the object, if the device was hit, that impact is sensed by the sensing unit 1 and inputted into the working memory 5 via the recognition unit 2 where the impact is converted to variations in its concerns. The data sheet for this event in the working memory 5 is complete upon inputting the variations in its concerns. This data sheet is provided to the long-term memory 6 and updates the data therein. After one data sheet is complete (one event is over) and stored in the long-term memory 6, the device proceeds to a new event.

Basic Data Flow

Figure 2:
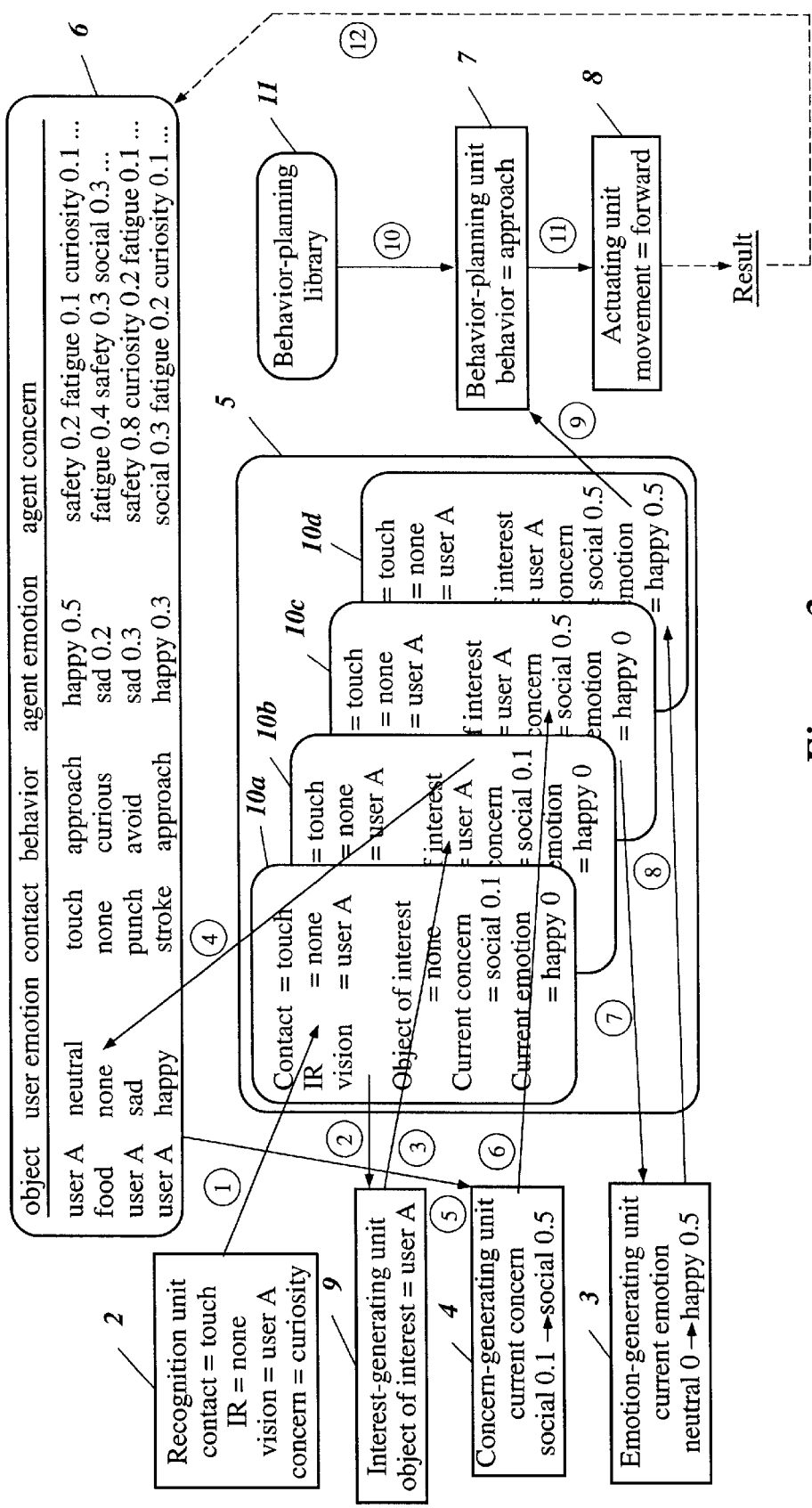
FIG. 2 is a diagram showing data flow and processing flow of an embodiment according to the present invention.

FIG. 2 is a schematic diagram showing data flow and processing flow of an embodiment according to the present invention. In this figure, first, the external/internal environment recognition unit (recognition unit) 2 outputs information (e.g., CONTACT=TOUCH; IR (infrared sensor)= NONE; VISION=USER A) to the working memory 5 which writes the information on a data sheet 10*a*. The information is derived from the sensing unit 1 and shows that the device is being touched, there is no obstacle in front of the device, and the device is seeing user A. The data sheet 10*a* includes items "CONTACT", "IR", "VISION", "OBJECT OF INTEREST", "CURRENT CONCERN", and "CURRENT EMOTION". These items are simply an example and can be selected depending on the types of sensors and recognition systems. In the data sheet 10*a*, "CONTACT", "IR", and "VISION" are updated using the information (current status) from the recognition unit 2.

Second, the current status is inputted into an interest-generating unit 9. The interest-generating unit 9 is programmed to select an object of interest based on the information from a data sheet 10*a* in the working memory 5. For a simple device, the objects can be pre-selected, or can be defined by simple terms such as color, movement, and sound. That is, the "user" can be defined by motion, color, and voice, or simply by an electronic name tag. If the interest-generating unit 9 does not find an object based on the information, the device behaves under predetermined rules such as "explore until an object is found" or "approach the object until the device's emotions change". If the interest-generating unit 9 finds an object, the object is designated temporarily as an object of interest, and the control system continues processing.

Third, the interest-generating unit 9 outputs the information (OBJECT OF INTEREST=USER A) to the working memory 5 which updates "OBJECT OF INTEREST" (data sheet 10*b*). The data sheet 10*b* and the data sheet 10*a* are the same, but simply for the purpose of showing changes with time or by step, the data sheet 10*b* is separately indicated (data sheets 10*c* and 10*d* are separately indicated for the same reason).

Fourth, the information (OBJECT OF INTEREST=USER A) is inputted to the long-term memory 6. The long-term memory 6 has a spreadsheet wherein data are stored under the indexes of objects. Various data storage systems can be adapted in the long-term memory. Here, the memory stores data after every event. From the long-term memory 6, data stored under the index of user A are extracted. Extraction can be conducted in various ways. If the data sheet includes more information or items, data can be extracted under plural indices. For example, data can be collected under indices of "USER A", "TOUCH", and "APPROACH". Here, a single index, "USER A", is used. Under the index of "USER A", variations of concerns on record are totaled and averaged (or processed under predetermined rules such as "the older the record, the less the contribution becomes"). Each concern-parameter can be determined separately from the other concern-parameters. In this figure, however, for simplifying explanation, a single scale is used; that is, "SOCIALITY" scores are determined. For example, as a result of collecting data under the index of "USER A", if a variation in "SOCIALITY" is calculated at 0.4, the score is added to the current concern score.

Fifth, the calculated variation is inputted into the concern-generating unit 4 which generates a current concern of "SOCIALITY 0.1". The score 0.4 is added to the current concern, resulting in "SOCIALITY 0.5". There are various ways to determine "CURRENT CONCERNS" other than addition. The initial current emotion may have a time factor, i.e., changing with time (usually fading with time). The concern-generating unit 4 is programmed to generate concern-parameters (explained later), and here, "sociality" has the highest intensity among the concern-parameters (e.g., "sociality", "safety", "curiosity", etc.). If the highest current concern is not sociality, user A may not be a good object of interest based on the variations of concerns recorded in the long-term memory 6. In that case, as explained below, the emotion-generating unit 3 generates negative values of emotions, and accordingly, the device is actuated to ignore user A or move away from user A to find an appropriate object.

Sixth, the information (SOCIALITY=+0.5) is inputted into the working memory 5 which updates "CURRENT CONCERN" under predetermined rules (data sheet 10*c*).

Seventh, the information (SOCIALITY=+0.5) is inputted into the emotion-generating unit 3. Here, the current emotion was initially "NEUTRAL" ("HAPPY" 0 (zero)). The emotion-generating unit 3 is programmed to generate emotion-parameters based at least on the current concern-parameters and the updated concern-parameters (explained later). Here, the "SOCIALITY" score increases of 0.4, and the emotion is changed from "NEUTRAL" to "HAPPY 0.5". The initial current emotion may have a time factor, i.e., changing with time (usually fading with time).

Eighth, the information (HAPPY=+0.5) is inputted into the working memory 5 (data sheet 10*d*). Here, the current emotion was initially "HAPPY 0" and changed to "HAPPY 0.5".

Ninth, the behavior-planning unit 7 receives the information of the data sheet 10*d* from the working memory 5. Here, the information indicates that the device is being touched, there is no obstacle in front of the device, the device is seeing user A, and the emotion level (happy) increases of 0.5. The behavior-planning unit 7 is programmed to determine a pattern of behavior based on these pieces of information, by referring to a behavior-planning library 11 (step ten). Here, the behavior-planning unit 7 selects "APPROACH" based on the situation that the emotion level increases of 0.5, and the direction is toward user A. The approaching speed may be dependent on the emotion level (e.g., the higher the level, the higher the speed becomes).

Eleventh, the behavior-planning unit 7 outputs the information (BEHAVIOR=APPROACH, etc.) to the actuating unit 8. The actuating unit 8 receives information from the behavior-planning unit 7 or directly from the working memory 5, so that the actuating unit 8 can determine the direction of movement to achieve the task (APPROACH to USER A). Here, the actuating unit 8 determines "FORWARD". As a result, the device further approaches user A while user A is touching the device.

Twelfth, the device receives a consequence of the action, and saves it in the long-term memory 6 as a new event.

In the figure, many flows are omitted. For example, the concern-generating unit 4 may receive the information (CONTACT=TOUCH, etc.) from the working memory 5 to generate the current concerns and to determine a satisfaction level of each concern. Further, the emotion-generating unit 3 may receive the information from the concern-generating unit 4 and/or the recognition unit 2 in order to generate emotion-parameters.

Basic Flow Chart

Figure 3:
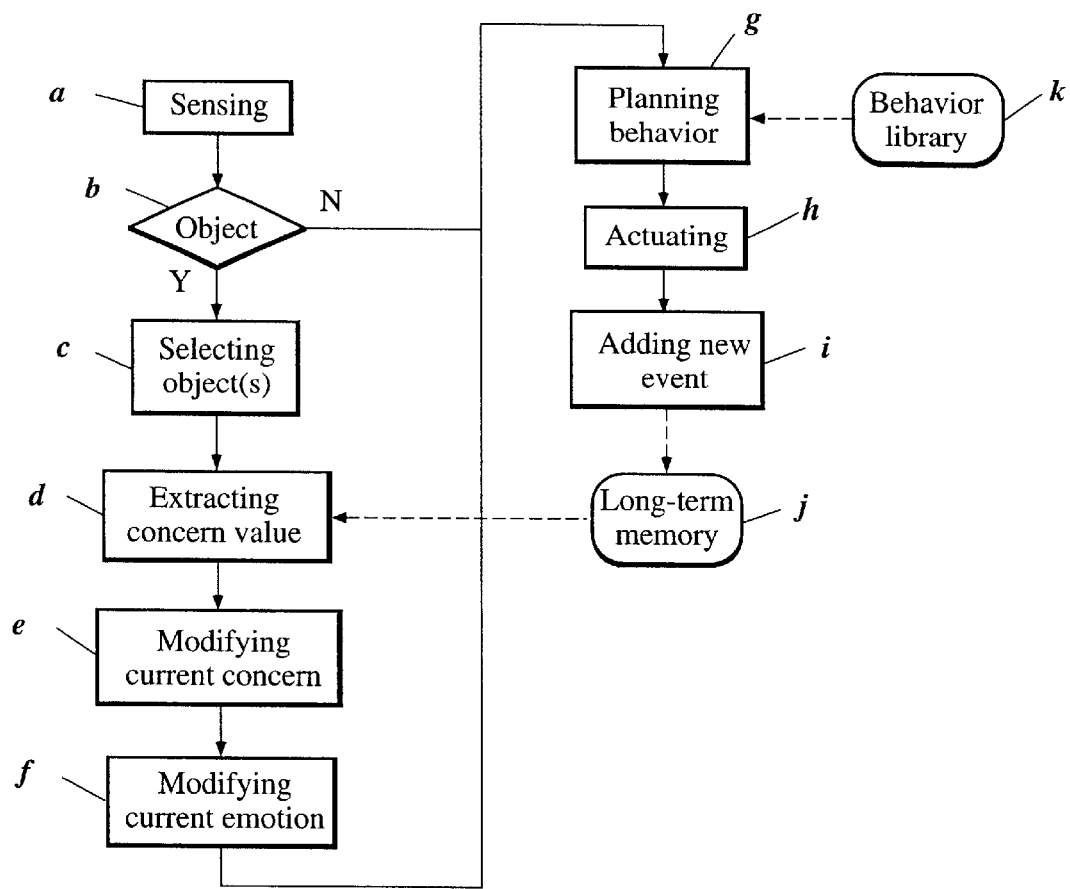
FIG. 3 is a flow chart diagram showing an embodiment of the control system according to the present invention.

FIG. 3 is a flow chart diagram showing an embodiment of the control system according to the present invention. As shown in FIG. 3, the device senses the external and internal environment (step a). The control system checks whether an object is recognized (step b). If an object is observed, the object is selected as an object of interest (step c). Subsequently, if the object is found irrelevant, the device ignores the object, but in step c, the device can assume that the object is an object of interest for simple processing. Under the index of the object, information on concern values is extracted from the long-term memory j (step d). Based on the information, the current concerns generated by the concern-generating unit are modified (step e). Based on the modified current concerns, the current emotions generated by the emotion-generating unit are modified (step f). Based on the modified emotions, the behavior-planning unit plans behavior by referring to the behavior library k (step g). The device is actuated based on the information from the behavior-planning unit (step h). In step b, if no object is found, the behavior-planning unit generates commands based on the current concerns and/or emotions under predetermined rules (step g). The device is then actuated (step h). As a result, the device experiences consequences of the device's behavior. The consequence is sensed by the sensing unit and recognized by the recognizing unit, and then the data are recorded as a new event (if no previous relevant event was found) or the data updates the previous data (if a relevant event was found) (step i).

Sensing and Recognition Units

In an embodiment, the device may comprise a CCD camera as a visual detection means, a pressure-sensing sensor and an approach-sensing sensor as touch detection means, a microphone as a hearing-detection means, and an infrared sensor as an obstacle-detection means. The device may further comprise a battery capacity sensor which detects the remaining capacity of the battery. Alternatively, the device may comprise a radio wave signal receiver. By using these sensing means, the device detects objects, the environment, and internal conditions. Further, these sensors allow the device to detect the state of the user, such as a tone of voice, facial expressions, and gestures, and the operational environments where the device is used.

If the device is a robot, the CCD camera is installed on the top of the head and can be set in any direction via a universal joint. For example, the robot can be controlled in such a way that the robot automatically moves toward an object, such as a human or animal, which is a cause or source of information such as changes in temperature and sound. Image information such as facial expressions of the user and surrounding environments is supplied to a controller.

The pressure-sensing sensor may be installed in the lower front of the robot so that when the robot has actual contact with an obstacle, such information is provided to the controller.

The microphone may be installed on the side of the head of the robot, and provides information to the controller upon collecting sound/voices arose around the robot.

In the present invention, the sensed signals, i.e., primitive information, can be used directly, without further processing. For example, if a color is sensed, and if the control system is designed to work based on the color (an object is recognized simply by the color), no further processing is required. However, if the device is designed to respond to more than the color, the device needs to recognize more complex information and may require processing information. For example, based on the color, movement, and sound, the object can be recognized. Further, if complex recognition systems are used, the user's facial expression can be detected, and the device can respond to the emotions of the user which are represented by the facial changes (Hanaya, et al., "An attempt of individual identification from face photographs", Technical Report of the Institute of Electronics, Information and Communication Engineers, CS96-123, IE96-92 (1996-12), pp. 55–60). A face neuron or neural network technology can be adapted.

In the present invention, for the purpose of simple experimentation, by using a radio wave detection sensor, the device can detect an object which possesses an identification tag transmitting identification information. The radio wave detection sensor can transmit radio waves and receive resonance signals emitted from the identification tag which has a particular resonance circuit. In addition, magnetic identification or bar code identification can be adapted. Further, a neural network can be used for recognizing an object based on the sensed signals.

Concern-Generating Unit

The concern-generating unit is used for selecting an object of concern, so that the device can behave and collect data efficiently, and can improve its behavior quickly, without information overflow. The device can select an object by itself, without a user's command, so that the device can behave autonomously. The concern-generating unit can be independent from the external conditions or environment, and can be a function of its own equations. However, the concern-generating unit may be affected by the internal conditions such as battery level and the degree of satisfaction of each concern-parameter. Further, the concern-generating unit may have a time factor and change each concern-parameter with time. A change with time may occur in the direction of fading. The functions controlling each concern-parameter can be independent of each other, and they may create fluctuation cycles of each concern-parameter. For example, concern in "play" may fluctuate at predetermined intervals. The working memory may store data showing the number of occurrences of "play" and a degree of satisfaction, so that the concern-generating unit receives the data and modifies each concern-parameter. The working memory shown in FIG. 3 can include the item "capacity" which shows a level or degree of satisfaction, and, for example, when the consequent emotion is positive, the working memory outputs a signal to the concern-generating unit to raise the satisfaction level or degree. In general, the concerns are positioned at a higher level than the emotions, and the emotions are controlled by the concerns. However, the emotions can be one of the factors that modify the concerns. If each concern-parameter is metaphorically represented by contents in a tank, its satisfaction level can be represented by the level of the contents. The tank has two level switches; a first switch is a lower switch disposed at a lower part of the tank, which triggers opening a valve to fill the tank with the contents (concern-parameter), and the other switch is a higher switch disposed at a higher part of the tank, which triggers closing the valve to stop filling the tank with the contents (concern-parameter). Even if the tank is full, the contents leak slowly with time, and eventually the lower switch will be activated. While the valve is open, new contents are introduced into the tank every time "sleep" is satisfied. The above mechanism can readily be realized in a program. If there are a plurality of concern-parameters, a plurality of tanks as above can be used, and the filling speed, the leaking speed, the positions of the lower switch and the higher switch can vary among the tanks (concern-parameters). As described above, the concern-generating unit can readily be preprogrammed.

Figure 4:
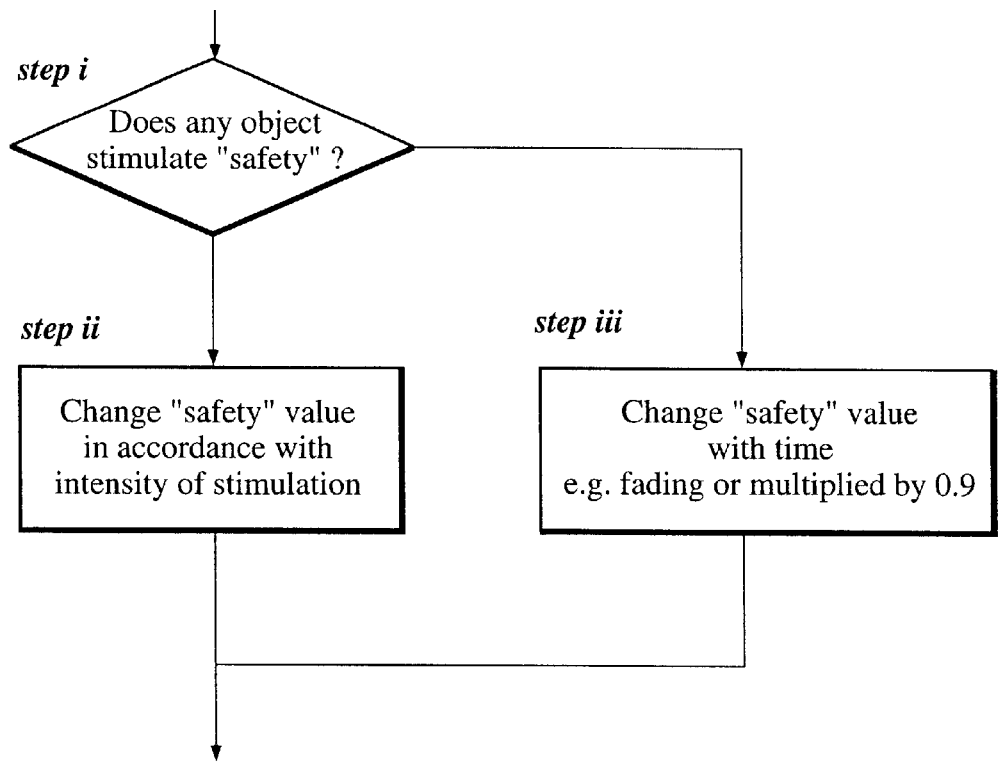
FIG. 4 is a diagram showing an embodiment of a flow chart showing time management flow in the present invention.

In another embodiment, changes with time can be achieved as shown in FIG. 4 which is a flow chart showing time management flow. In FIG. 4, if there is any signal stimulating "safety" (step i), the value of the concern-parameter is modified in accordance with the intensity of the stimulation (step ii). If there is no signal stimulating "safety" in step i, the value of the concern-parameter is modified under predetermined rules (step iii). In FIG. 4, the value of the concern-parameter is fading or is multiplied by 0.9.

Figure 5:
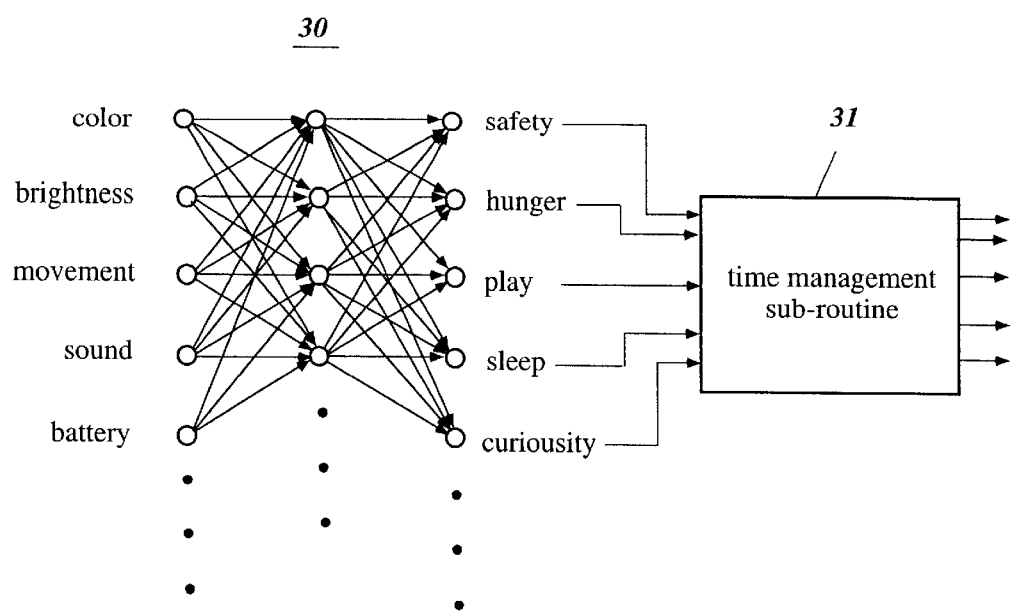
FIG. 5 is a diagram showing an embodiment of a neural network for the concern-generating unit in the present invention.

In another embodiment, the concern-generating unit can be established using a neural network by regulating a relationship between the recognized signals and the concern-parameters. FIG. 5 is a diagram showing an embodiment of a neural network 30 for the concern-generating unit. When using the neural network, each concern-parameter is related to one another. In addition, output of the neural network is connected to a time management sub-routine 31 to change each output with time. The time management can be conducted by activating the time factor (e.g., reducing 10%) at pre-selected time intervals or after every (or pre-selected number) running cycle(s) of a program.

The neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

Further, the concern-generating unit can be constituted by a multi-dimensional map defined by the recognized signals and the concern-parameters.

The concern-generating unit may select one concern-parameter which has the lowest value among all of the concern-parameters at the time the concern-generating unit is called for. Selection of a concern-parameter can be conducted in various ways, including selection at random or under predetermined rules or functions.

Object Recognition

When the device has a new experience, that is, when no event is extracted from the long-term memory, the device can categorize an object or situation in order to record the new experience in the long-term memory. However, if the device observes a new object, the device cannot respond to it. For example, if "user B" is observed, but the device has never interacted with user B, the device may not recognize user A as a potential object. If the objects are defined by genetic characteristics or loose rules such as a "moving" object making "sound", user B can be an object of concern. After the device observes user B and while the device interacts with user B, the device can collect data on identification of user B by using the sensing unit. The data can be stored in the long-term memory and written in the spreadsheet under the index of user #2. Subsequently, when the device observes user #2 inputs data on a data sheet in the working memory, the device extracts data on user #2 from the long-term memory.

Figure 6:
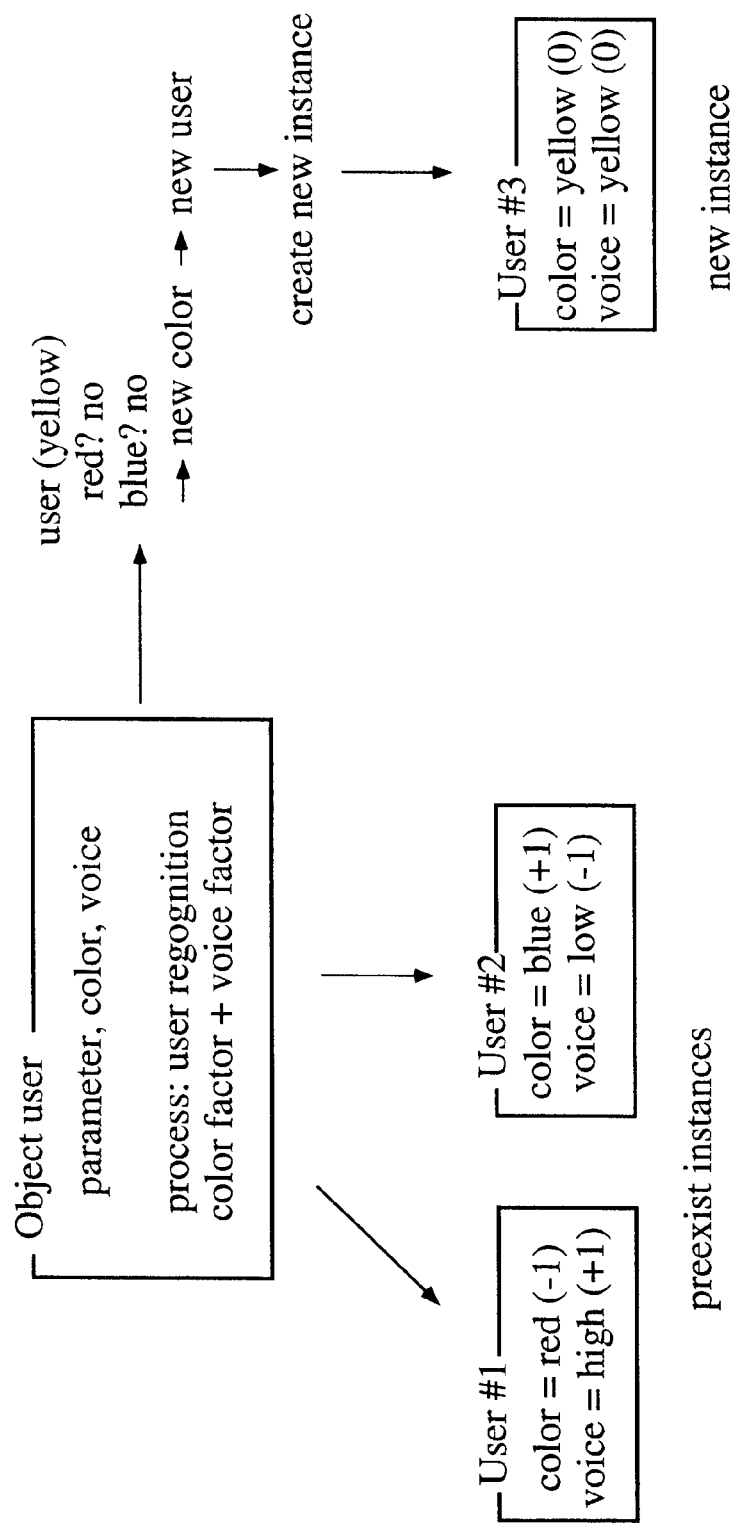
FIG. 6 is a diagram showing an embodiment of schematic processes of JAVA in the present invention.

By using object-oriented languages such as JAVA and C++, the number of objects of concern can be increased autonomously. For example, in JAVA, first, "objects" are defined by "parameters" and "methods", and then, instances are defined based on "parameter" and "method". FIG. 6 is a diagram showing schematic processes of JAVA. In this figure, the "object" is "user", and "user parameters" are "color" and "voice", and "method" is (user parameter× (color+voice)). Here, the program stores two instances; user #1 (color=−1(red), voice=+1(high)), and user #2 (color=+1 (blue), voice=−1(low)). When the device observes user #3 (color=−0(yellow), voice=0(intermediate)), the program checks whether user #3 falls within the profiles of user #1 or #2. Here, user #3 is neither red (−1) nor blue (+1), indicating that user #3's color is new which is 0 (yellow). The program creates a new instance under the index of user #3 and defines user #3 by color (0, yellow) and voice (0, intermediate). When the device does not observe an object of concern, the device may select an object which the device is seeing, as an object of concern as explained above. User #3 will be one of objects of concern. That is, when the concern-generating unit selects "play", the program checks whether the object the device is seeing is either one of users #1, #2, and #3. By continuing such experiments, the device stores many objects of concern.

Emotion-Generating Unit

Figure 7:
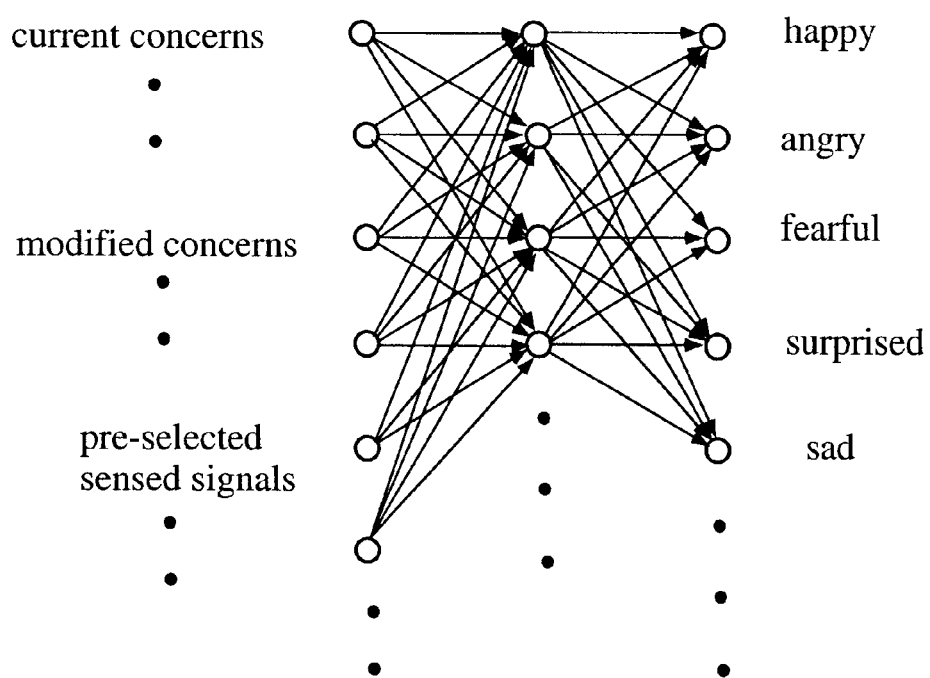
FIG. 7 is a diagram showing an embodiment of an emotion-generating unit using a neural network in the present invention.

Emotions generated by the device may be used for modifying the behavior selected by extracting data from the long-term memory. The emotion-generating unit can be operated by various ways which include a neural network. FIG. 7 is a diagram showing an embodiment of an emotion-generating unit using a neural network. The structure of the neural network in FIG. 7 is similar to that indicated in FIG. 5. The difference is that, in addition to pre-selected sensed signals (such as impact and sound), this neural network uses, as input, signals of the current concerns (such as safety, curiosity, and hunger) generated by the concern-generating unit and the modified concerns obtained based on the information extracted from the long-term memory. Accordingly, if there is a negative discrepancy between the current concerns and the modified concerns, the device may develop negative emotions such as "sad" and "angry", which negative emotions affect the device's behavior. For example, if the current concern is hunger (unsatisfied=a negative value), but the object the device is observing is user A who will not satisfy the device as to the concern of hunger (i.e., no positive value will be provided), the device may develop the emotion of sadness or anger, thereby avoiding the object to find another object. If the current concern is sociality (unsatisfied=a negative value), and the object the device is observing is user A who will satisfy the device as to the concern of sociality (i.e., a positive value will be provided), the device may develop the emotion of happiness, thereby approaching the object. The input-output relationship of the neural network may be regulated in advance by off-line training, although the neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

For establishing an emotion generation system, the technology disclosed in U.S. patent application Ser. No. 09/059,278, filed Apr. 13, 1998, by Tamiya, et al., entitled "CONTROL SYSTEM FOR CONTROLLING OBJECT USING PSEUDO-EMOTIONS GENERATED IN THE OBJECT", can be adapted to the present invention. The reference is hereby incorporated herein as reference. In the above, each emotion-parameter is defined by a facial expression which the robot can output, and teacher data are not required to establish the neural network if output evaluation can be conducted by using reward signals (e.g., being caressed) or penalty signals (e.g., being hit), instead of teacher data.

Further, the emotion-generating unit can be constituted by a multi-dimensional map defined by the recognized signals and the emotion-parameters.

For a very simple model, the input-output relationship in the emotion-generating unit can be simplified by directly relating variations in the concerns with emotions, without the sensed signals. A discrepancy between the current concerns and the modified concerns can be determined by the least square method.

Behavior-Planning Unit

Figure 8:
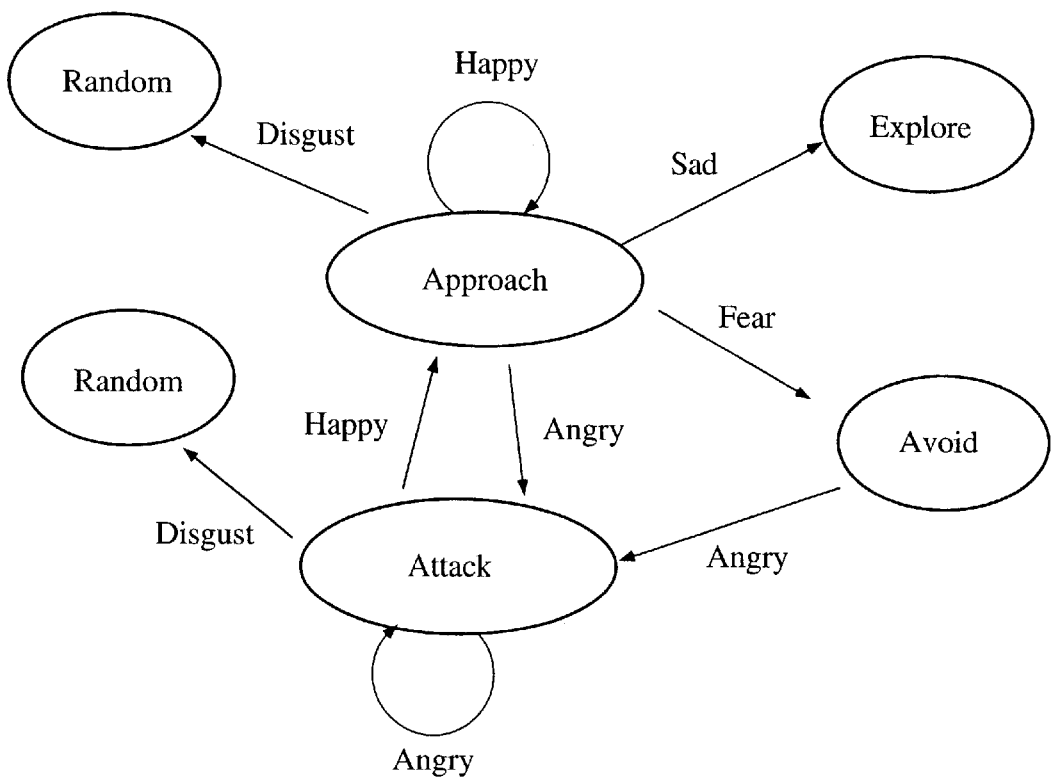
FIG. 8 is a diagram showing an embodiment of behavior patterns in the present invention.

FIG. 8 is a diagram showing an embodiment of behavior patterns (behavior library). As a result of variations in the concerns, the emotions are modified, and behavior will be selected. For a highly simplified device, the behavior-planning unit can be very simple. For example, the following conditions can be predetermined:

| Modified Concern | Behavior |
|---|---|
| Sociality | Approach |
| Safety | Avoid |
| Fatigue | Sleep |
| Curiosity | Explore |
| ... | ... |

The selected behavior can be modified by variations in its emotions. That is, the device's behavior is modified in accordance with the variations in the emotions. If the initial behavior is "APPROACH", when the device raises an "ANGRY" score, the behavior is changed to "ATTACK"; when the device raises a "FEAR" score, the behavior is changed to "AVOID"; when the device raises a "DISGUST" score, the behavior is changed to "RANDOM"; when the device raises a "SAD" score, the behavior is changed to "EXPLORE"; when the device raises a "HAPPY" score, the behavior is not changed, but may be more active (faster movement). If the initial behavior is "ATTACH", when the device raises a "HAPPY" score, the behavior is changed to "APPROACH"; when the device raises a "DISGUST" score, the behavior is changed to "RANDOM"; and when the device raises an "ANGRY" score, the behavior is not changed, but may be more active (faster movement). When the device avoids the object, the device raises an "ANGRY" score (run away is not successful), the behavior is changed to "ATTACK". In the long-term memory, the action which is actually performed is recorded and linked with the other data under the index of the situation.

These behavior patterns can be established by a neural network by regulating the input-output relationship or by a multi-dimensional map. Further, coupling coefficients of the neural network can be modified using evolutionary computing technology such as genetic algorithms and genetic programming. However, if on-line establishment is conducted, a "training" period will be required. For establishing behavior patterns, the technology disclosed in U.S. patent application Ser. No. 09/059,278, filed Apr. 13, 1998, by Tamiya, et al., as described above, can be adapted to the present invention. The reference is hereby incorporated herein as reference.

Further, the behavior-planning unit can be constituted by a multi-dimensional map defined by the generated concern-parameters and the generated emotion-parameters. In the above, if the device has a plurality of moving parts, all moving parts can be allocated on a multi-dimensional map. This approach can be used in combination with a neural network, wherein a multi-dimensional map is connected downstream of the neural network. For example, sensed signals, emotion-parameters, and concern-parameters (these data are stored in the working memory) are used as input signals of the neural network. "APPROACH", "ATTACK", "EXPLORE", "AVOID", "RANDOM", "STILL", etc. are outputted from the neural network. Training the neural network can be conducted off-line. Downstream of the neural network, a multi-dimensional map is connected, which regulates the output in such a way, for example, that if "APPROACH" 0.1 and "EXPLORE" 0.3, the device slowly moves toward the object with a tail slowly moving. Not only the neural network but also the map can be modified by using evolutionary computing technology. Evolutionary reinforcement learning methods does not require teacher data. Evaluation functions can be obtained by using reward signals (e.g., being caressed) or penalty signals (e.g., being hit), instead of teacher data.

Figure 9:
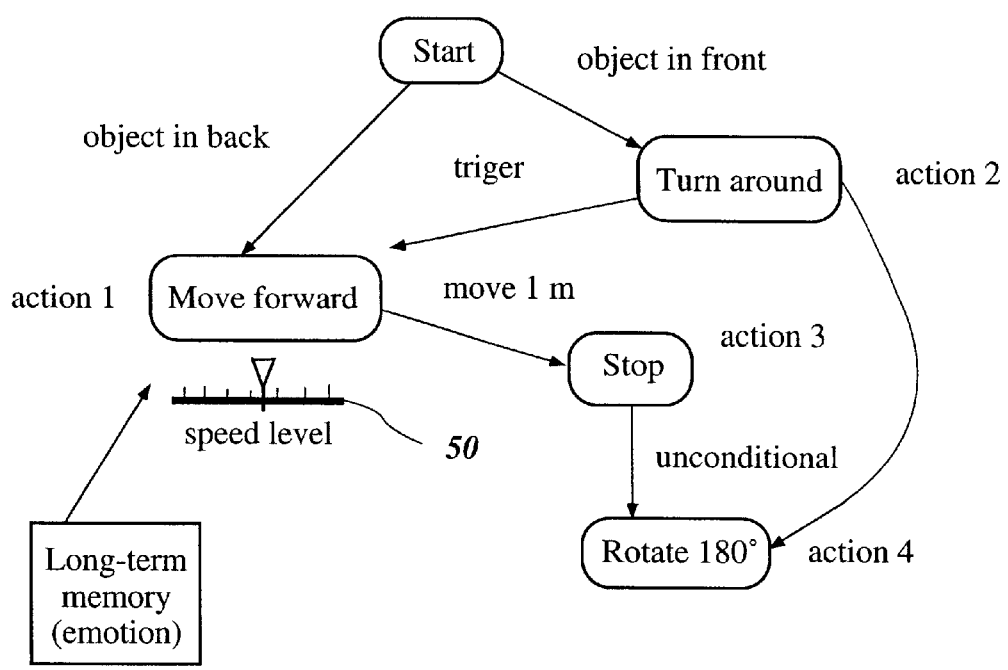
FIG. 9 is a diagram showing an embodiment of a behavior control system in the present invention.

FIG. 9 is a diagram showing an embodiment of a behavior control system. The behavior-planning unit can have a plurality of modules, each regulating one action. The modules can be selected by using technology described above. Each module commands the device's movement sequentially on conditions of the external and internal conditions. FIG. 9 shows an embodiment of a "RUN AWAY" module. If the object is behind the device, the device moves forward (action 1). If the object is in front of the device, the device turns around (action 2). If predetermined conditions are satisfied, action 1 (moving forward) is triggered from action 2. A trigger may be defined by the distance from the object, the moving speed of the object and its direction, the intensity of sound the object is making, the absence of obstacles, etc. The trigger can be determined based on theoretical sum of all of the conditions, each having a trigger range. If the device moves a certain distance, the device stops (action 3). If the device stops, the device turns at 180 degrees without condition (action 4). If the object is close to the device, action 2 is triggered. If the object is not close to the device, the series of actions end. In the above, each action is constituted by a sub-module. Each sub-module can include emotion-parameters. For example, the module for action 1 (moving forward) can be programmed to change the moving speed in accordance with emotion-parameters. If a "FEARFUL" score is high, the device moves faster than when the score is low. If the device moves away from the object, but the device is hit by the object, the "FEARFUL" score becomes high. These data are transferred to the working memory and update the data sheet. The data are saved in the long-term memory. Subsequently, when the device faces the same situation and extracts the data from the long-term memory, the sub-module for action 1 receives a signal to raise the moving speed (50). As described above, the spreadsheet in the long-term memory, the data sheet in the working memory, and the action modules can be modified based on the user's preferences.

Other Features

In the above, if the device does not have sufficient capacity (processing capacity, data storing capacity), the connected toy can be connected to an external system (computer) through cordless networks. That is, the data and/or programs used in the present system, including the long-term memory, the working memory, the emotion-generating unit, the concern-generating unit, and the behavior-planning unit, can be saved or installed in a separable medium such as a compact disc (ROM or RAM) or IC card, so that the user can implant the information in another device. In addition, the data and/or programs can be transmitted to another device via communication means. By using the above technology, plural memory media of plural devices can be hybridized or cross bred to create a new system. The data can be pooled from plural devices and installed into a new device which will possess an extensive memory even if the new device has never been used. By changing the programs, behavior patterns of the device can be changed. Further, any one or more of the intelligent portions of the device including the recognition unit, the emotion-generating unit, the concern-generating unit, and the behavior-planning unit can be installed in a main computer separately from the device, wherein a network is established between the main computer and the device via, for example, the Internet, so that the device can be made compact, and which may need to have simply sensing units, an output unit, and a communication unit for contacting the main computer. Through the sensing units of each device, it is possible to monitor the user or the external environment of each device, by use of the main computer. Further, each device can be connected to other devices to establish a network of devices to exchange information.

Other Aspects

In the present invention, correlations between various inputs and various outputs of the control system can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any technique.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and Aug. 29, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

Further, the evolutionary computing includes a multi-agent system which is used for competitive co-evolution (Tamashiro, et al., "Study about the performance of competitive co-evolution in multi-agent system", Technical Report of the Institute of Electronics, Information and Communication Engineers, NS99-16 (1999–06), pp. 37–41).

Further, in the above, neural networks may be used for learning control rules. However, a CMAC (Cerebellar Model Arithmetic Computer) can also be used. The CMAC is excellent in terms of additional learning and the high speed of learning, as compared with the hierarchical neural network.

Other Applications

In the above, the device may be a personal robot, toy robot or robot pet. However, the device of the present control system is not limited to a toy robot, and can be any given control which can be used in a vehicle, an auxiliary drive of a bicycle, or wheelchair, or an industrial robot.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method for adjusting behavior of a device based on the device's experience, said device comprising: (i) a sensing unit for sensing signals; (ii) a concern-generating unit programmed to generate concern-parameters for defining the device's interest; (iii) an emotion-generating unit programmed to generate emotion-parameters for defining the device's emotions; and (iv) an actuating unit for actuating the device, wherein the concern-parameters and the emotion-parameters are different sets of parameters and do not overlap with each other, and the concern-generating unit and the emotion-generating unit are different units, said method comprising the steps of:

(a) recognizing an object based on signals receivable by the device, said device having current concern parameters generated by the concern-generating unit;

(b) extracting information, if any, on concern-parameters associated with the object from a discrete memory, said memory storing information on concern-parameters previously generated by the device through past interaction with the object;

(c) modifying the current concern-parameters by the extracted information on concern-parameters to obtain modified concern-parameters;

(d) generating emotion-parameters by the emotion-generating unit based on a discrepancy between the current concern-parameters and the modified concern-parameters under predetermined rules;

(e) actuating the device based on the modified concern-parameters and the emotion-parameters; and (f) inputting in the memory concern-parameters generated by the device upon interaction with the object, thereby updating the memory.

2. The method according to claim 1, wherein, in step (d), behavior of the device actuated based on the emotion-parameters is pre-selected based on the modified concern-parameters under predetermined rules.

3. The method according to claim 1, wherein, in step (b), if no information on the object is extracted from the memory, the device behaves under predetermined rules.

4. The method according to claim 1, wherein the concern-generating unit has a predetermined input-output relationship, wherein said concern-generating unit receives pre-selected sensed signals and outputs the concern-parameters.

5. The method according to claim 1, further comprising a working memory which temporarily pools and stores information from the sensing unit, the concern-generating unit, and the memory used in step (b) until the device completes its action, and which outputs information to the concern-generating unit, the emotion-generating unit, the actuating unit, and the memory used in step (b).

* * * * *